United States Patent
Eason (10) Patent No.: US 6,789,772 B2
(45) Date of Patent: Sep. 14, 2004

(54) OFF-AXIS REDUCIBLE SUPPORT STRUCTURE

(75) Inventor: Donald H. Eason, Fort Collins, CO (US)

(73) Assignee: Ultimate Support Systems, Inc., Fort Collins, CO (US)

( * ) Notice: Subject to any disclaimer, the term of this patent is extended or adjusted under 35 U.S.C. 154(b) by 0 days.

(21) Appl. No.: 10/342,668

(22) Filed: Jan. 14, 2003

(65) Prior Publication Data

US 2004/0135043 A1 Jul. 15, 2004

(51) Int. Cl.[7] ............................................. F16M 11/38
(52) U.S. Cl. ...................... 248/166; 248/170; 248/171; 248/434; 248/435
(58) Field of Search ............................... 248/166, 167, 248/434, 435, 171, 170, 439

(56) References Cited

U.S. PATENT DOCUMENTS

| 1,745,845 | A |   | 2/1930  | Ebbecke   |          |
|-----------|---|---|---------|-----------|----------|
| 2,613,901 | A |   | 10/1952 | Tatar     | 248/166  |
| 2,709,560 | A |   | 5/1955  | Resk      | 248/169  |
| 2,845,244 | A |   | 7/1958  | Prokop    | 248/171  |
| 3,618,885 | A | * | 11/1971 | Muller    | 248/460  |
| 4,097,013 | A | * | 6/1978  | Broome    | 248/171  |
| 4,128,252 | A | * | 12/1978 | Raniero   | 280/40   |
| 4,215,839 | A |   | 8/1980  | Gibran    | 248/170  |
| 4,915,332 | A | * | 4/1990  | Ouellette | 248/171  |
| 5,102,079 | A | * | 4/1992  | Lee       | 248/166  |
| 5,137,236 | A | * | 8/1992  | Burns     | 248/171  |
| 5,222,705 | A |   | 6/1993  | Gibran    | 248/170  |
| 5,913,269 | A |   | 6/1999  | Franssen  | 108/25   |
| 6,179,266 | B1|   | 1/2001  | Hutten    | 248/465  |
| 6,209,829 | B1| * | 4/2001  | Yu        | 248/122.1|
| 6,412,737 | B1| * | 7/2002  | Minagawa  | 248/166  |
| 6,454,228 | B1| * | 9/2002  | Bosnakovic| 248/177.1|

* cited by examiner

Primary Examiner—Amy J. Sterling
(74) Attorney, Agent, or Firm—Santangelo Law Offices P.C.

(57) ABSTRACT

A reducible support system for supporting various items is presented in various embodiments. A reducible support structure, may comprise an operation element which may be attached to an orthogonal element. Limbs, preferably a tripod may be attached to the operation element and a plug element may provide a slide so that the limbs or tripod may open and collapse easily.

31 Claims, 10 Drawing Sheets

OFF-AXIS REDUCIBLE SUPPORT STRUCTURE

FIELD

This invention relates generally to the field of reducible support structures. Specifically, it relates to reducible support structures used with various stands which may be especially applicable to bicycle items, music items, illumination items, and particularly, to microphone stands. More specifically, the invention may relate to a reducible tripod base that may be easily collapsed and expanded using an off-axis relationship.

BACKGROUND

Collapsible stand devices have historically taken many forms dependent upon, generally, the user having to place their hand on the device where the user's hand may get trapped or pinched as the device may be being collapsed or opened. Traditional forms of collapsible stands and support systems may have incorporated many fields, such as tripods and easels, or the like.

One particular field in which reducible support structures may be widely employed may be the music industry. Particularly, the use of stands with musical instruments, loudspeakers, printed music, or the like, may have required various forms of reducible support structures. More specifically, the use of a microphone stands may have required various forms of reducible support structures.

While it is know in the art to have collapsible stands and support systems, there may be a need for a design that enables a user easy operation of a collapsible support system, parts of which may be easily and quickly brought into their reduced or expanded state with few steps and shielding the operator's hands and fingers away from moving parts.

With prior known constructions, such as in U.S. Pat. No. 6,179,266, issued to Hutten and U.S. Pat. No. 2,709,560, issued to Resk, each hereby incorporated by reference, the user's hands and fingers may be engaged within the movable parts during the collapsing or opening of the structure. As such, the user may have their fingers and hands caught in the device causing them to be pinched. Therefore, there may be a need for a collapsible support structure that shields the user's extremities, including hands and fingers, from the moving parts of the structure.

There may also be a need for a reducible support system that provides for a compact and low profile system that may be desired to allow for a more transportable and easily stored system. Particularly, in U.S. Pat. No. 1,745,845, issued to Ebbecke, hereby incorporated by reference, the legs of the device may not be secured when the stand may be closed. Thus, when the stand is being relocated, carried and/or stored, the legs may open causing the stand to extend or be in a partially extended state. The user carrying such stand may be inconvenienced by the moving parts and when stored, the device may be bulky and take up more space than needed. Therefore, there may be a need for a reducible support structure that fully secures the legs in place to provide safe transportation of the item and compactness for storage.

Additionally, U.S. Pat. No. 2,845,244, issued to Prokop, U.S. Pat. No. 2,613,901, issued to Tatar, and U.S. Pat. No. 5,913,269, issued to Franssen et al., each hereby incorporated by reference, teach, from various fields, reducible support systems. These systems, however, may be directed to reducible support systems which when collapsed or closed may not change the height or length of the structure or do not provide the user appropriate safety in operation. These systems, therefore, may not provide the desired characteristics including that of safety and a compact or low profile system identified in particular embodiments of the present invention.

The reducible support structures referenced above may lack a desired quickness and simplicity in its operation. Previous attempts may be found in U.S. Pat. No. 4,215,839 issued to Gibran and U.S. Pat. No. 5,222,705 issued to Gibran et al., each hereby incorporated by reference, wherein tripod structures are disclosed. From one perspective, these support systems may fail, generally, to provide appropriately simplistic assembly of the support structures. Particularly, support systems such as those heretofore identified may illustrate a collapsible support structure potentially requiring the adjustment of multiple elements within the support system to achieve a fully opened or collapsed structure. Thus there is a need for a support structure which appropriately balances the needs of the user and that is practical in operation.

SUMMARY OF THE INVENTION

Embodiments of the present invention may provide for reducible support systems that may address the inadequacies of previous techniques. The invention may comprise, according to particular embodiments, a reducible support structure and methods of supporting an item whereby the transporting and storing of the structure in different applications may be more easily accomplished. The invention may comprise, in preferred embodiments, a reducible support structure and methods of supporting an item whereby the structure may be opened and collapsed simplistically and with ease, while remaining sufficiently low-profile and compact. Further the invention may even provide a user-friendly structure that shields the user from any pinching during the reduction or expansion of a reducible support structure. In addition, the present invention may comprise embodiments particularly directed at applications such as bicycle stands, bicycle items, music items, illumination items, music instrument stands, work light stands, and microphone stands, among other applications. Embodiments of the present invention, therefore, may even be considered as a development away from previous efforts of reducible support systems, both generally and as more particularly described below.

It is accordingly one of the goals of the present invention to provide a novel apparatus for shielding a reducible support structure where a user may not be pinched and thus provide a shielded slide that allows easy simple movement when reducing the support structure.

Another goal may be to provide a reducible support structure that when fully reduced may be able to be stored in a minimum amount of space and also locks so that when transporting and storing the structure, it does not expand. It is accordingly a goal to provide a locking reducible support structure.

In addition, a goal of the present invention may be to provide a user-friendly structure in which a reducible support structure may be quickly set up and quickly reduced or collapsed.

Other objects of the invention are disclosed throughout other areas of the specification and claims. In addition, the goals and objectives may apply either in dependent or independent fashion to a variety of other goals and objectives in a variety of embodiments.

DETAILED DESCRIPTION OF THE PREFERRED EMBODIMENTS

As can be understood from the discussion, the present invention may be embodied in a variety of ways. Although discussed in the context of a particular initial design, it should be understood that the various elements can be altered and even replaced or omitted to permit other designs and functionality as appropriate. Referring to the figures beginning with FIGS. 1, 9, and 10, it can be seen that in one sense the invention involves a reducible support structure (10). In some embodiments, there may be a first element, preferably an orthogonal element (14) provided and at least one limb (12) attached to a second element, preferably an (14) operation element (16). The orthogonal element (14) may follow a longitudinal axis, where a longitudinal axis may follow some portion of the reducible support structure (10). The reducible support structure (10) need not be symmetrical about a longitudinal axis.

Further, an operation element (16) or a second clement may be attached to the orthogonal element (14). The operation element (16) may move along or respond to the longitudinal axis of the orthogonal element (14). The operation element (16) may surround the orthogonal element (14). Further, at least a portion of the orthogonal element (14) may be encompassed by at least a portion of the operation element (16); it may even be guided or perhaps retained by it. The operation element (16) may be guided by the longitudinal axis of the orthogonal element (14) when the operation element (16) moves.

Figure 3:
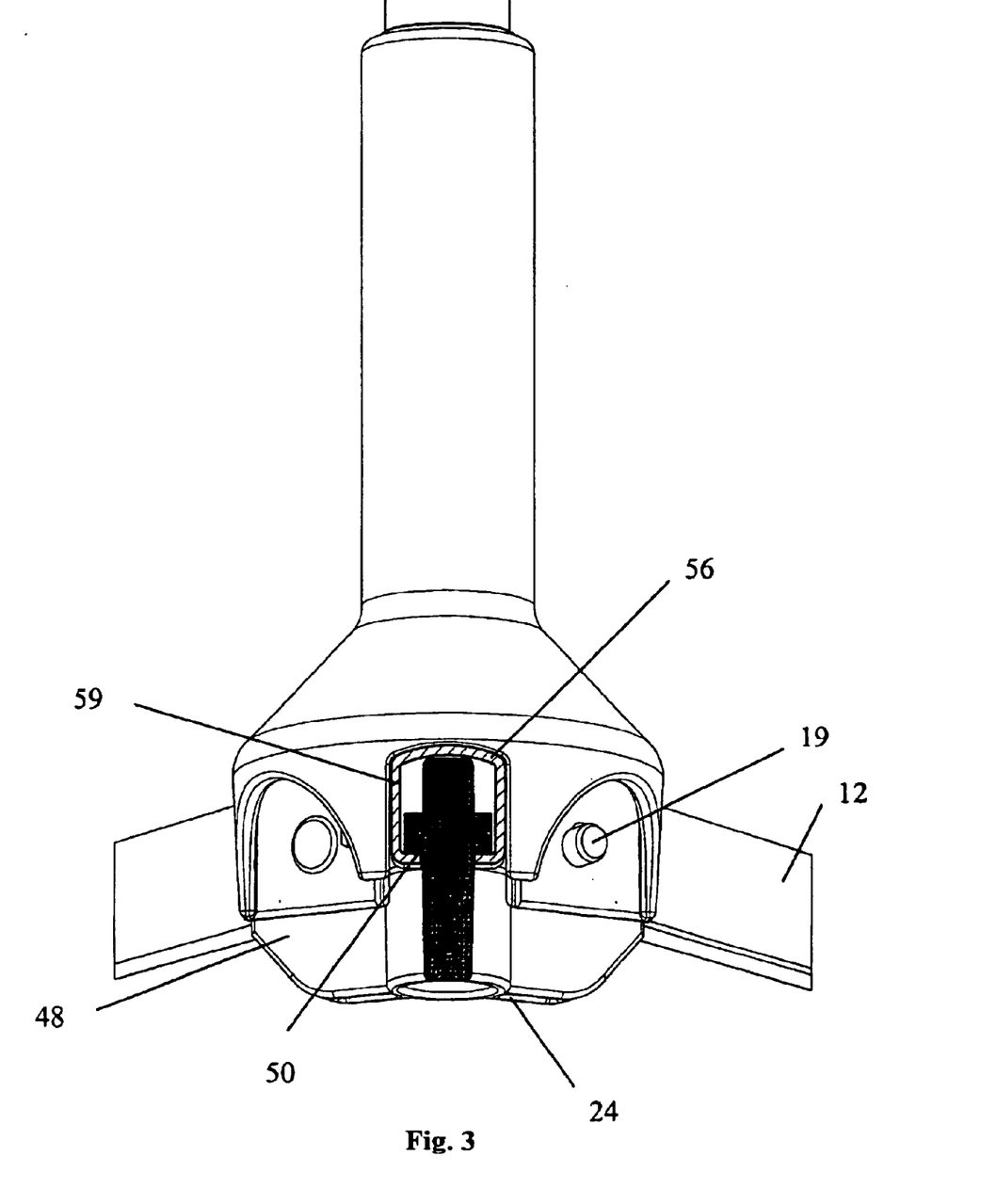
FIG. 3 is a cross sectional view of the present invention depicted in FIG. 2.
Figure 5:
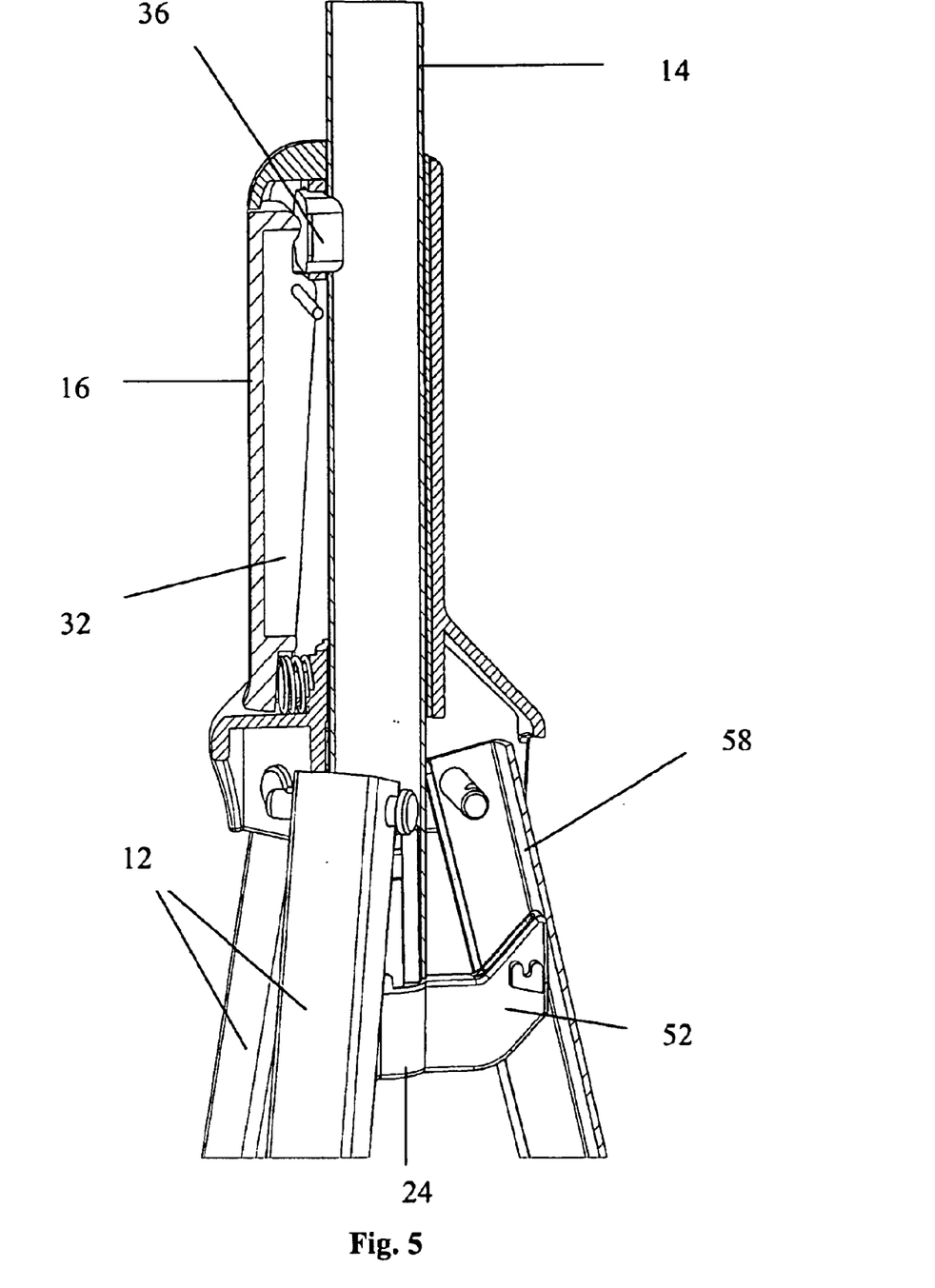
FIG. 5 is an exploded view of one embodiment of the present invention as a partially reduced structure.

As may be more particularly described herein, at least part of the limb (12) may be attached to at least part of the operation element (16) as shown in FIG. 5. In accordance with one embodiment, the limb (12) may be attached to the operation element (16) by a fastener (19). The fastener (19) may go through holes in the limb (12) and through holes in the operation element (16) which may secure the limb (12) to the operation element (16), as seen in FIG. 3. The fastener (19) may be a cylindrical rod, screw, or other fastening structures or element. Thus, when the operation element (16) may be moved, the limb (12) may also move or respond to the operation element (16).

The invention may further provide, in accordance with particular embodiments, an off-axis engaging of the limb (12). When the limb (12) may be engaged in movement, it may move in an off-axis manner. Off-axis may be the concept of having two non-aligned force vectors such as perhaps between a limb (12) force vector and an orthogonal element (14) force vector. Further, the present invention may provide for transposing at least one limb (12). Transposing may cause the limb (12) to open from a closed state or to close from an open state. This movement may also collapse the reducible support structure (10) or expand the reducible support structure (10).

Figure 9:
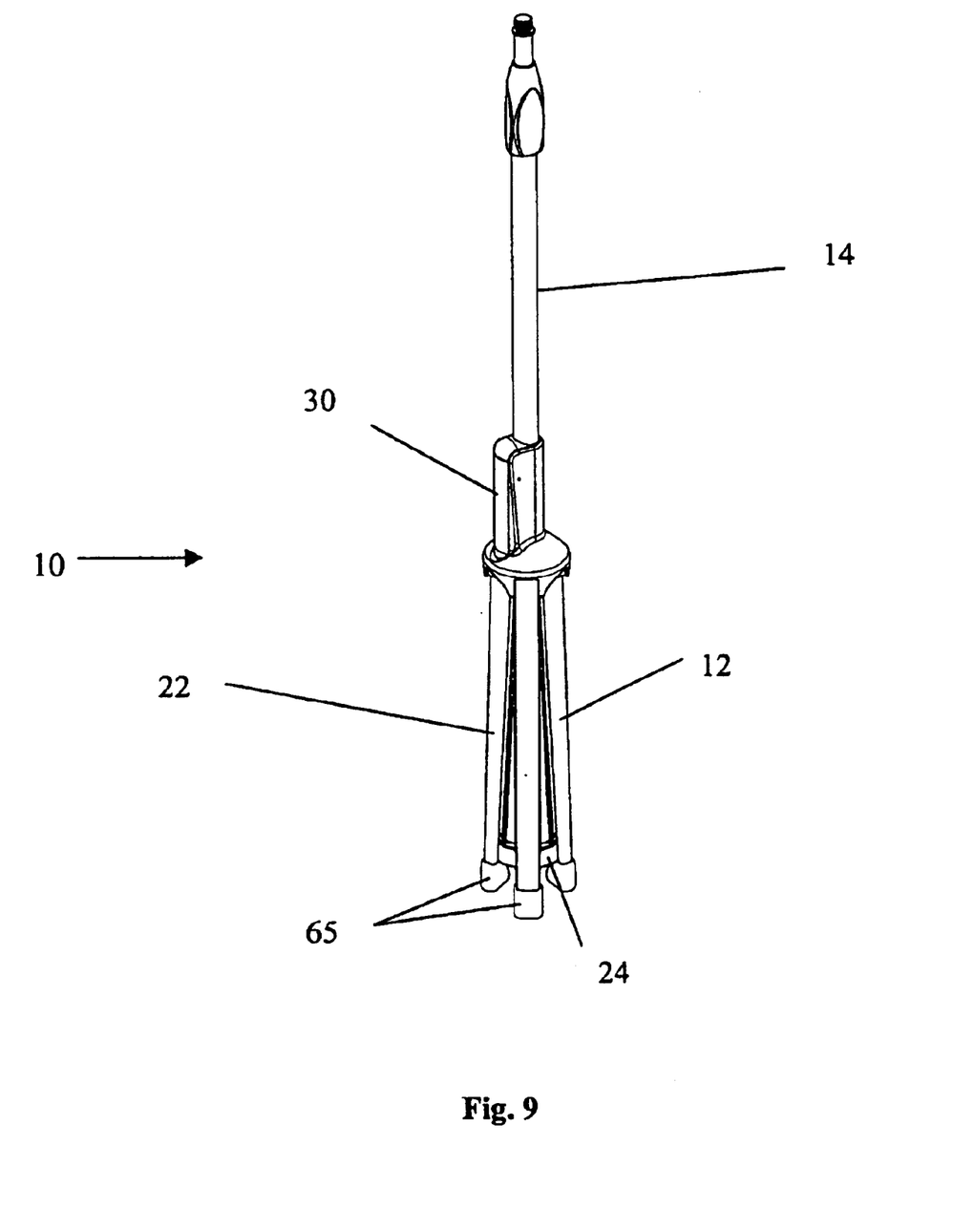
FIG. 9 is a view of one particular embodiment of the present invention as a fully reduced structure.

In an alternative embodiment, the present invention may provide for multipod. The multipod may comprise of more than one of the limb (12). As such, the present invention may provide for transposing a multipod, which may reduce and expand the reducible support structure (10). In a preferred embodiment, the present invention may comprise of a tripod (22), which may have three limbs (12), as shown in FIG. 9. Accordingly, the present invention may provide for transposing the tripod, which may reduce and expand the reducible support structure (10). More specifically, when the operation element (16) may be moved, the tripod (22) may respond to the operation element (16) and also move. When the reducible support structure (10) may be fully expanded, the limb (12) may but need not be almost perpendicular to the orthogonal element (14). When the reducible support structure (10) may be reduced, the limb (12) may be positioned in a nearly parallel relationship to the orthogonal element (14).

In accordance with some embodiments, the orthogonal element (14) may include a vertical column or vertically establishing a column. Vertical may present a top of the column substantially over the bottom of the column even if not truly vertical in a literal sense. The orthogonal element (14) may perhaps include a linear design where the reducible support structure (10) may be linearly designed. The orthogonal element (14) may further comprise a central member or establish a central member in relation to the reducible support structure (10).

The invention may further provide, in accordance with preferred embodiments, a locking element wherein an operator may lock, including but not limited to merely temporarily restraining, the operation element (16) along the orthogonal element (14). The locking element may be part of the operation element (16) where the locking element locks the operation element (16) on the reducible support structure (10), perhaps on the orthogonal element (14). As such, the operation element (16) may respond or stop when the locking element may be locked. Further, the locking element and operation element (16) may both move along the longitudinal axis of the orthogonal element (14). Accordingly, when the operation element (16) may be locked along the orthogonal element (14), the limb (12) may be also locked or temporarily restrained in a certain position because the limb may be attached to the operation element (16).

In accordance with some embodiments of the present invention, the locking clement may have a bias element. Such bias element may cause biasing, displacement, or perhaps pushing of some item, such as at least part of operation element (16) against the orthogonal element (14) causing the operation element (16) to be held at a stationary place along the orthogonal element (14). Thus, the operation element (16) may respond to the bias element by restricting movement of the operation element (16) along the orthogonal element (14). A bias element may be a spring (42), among other actuating force structures or elements.

Furthermore, the present invention may provide for a bias release. A bias release may force the bias element, as described above, out of its holding or biasing engagement, which may then permit the operation element (16) to move along the orthogonal element (14). Thus, when the bias release may be used, it may release a bias to allow movement of the operation element (16).

Figure 7:
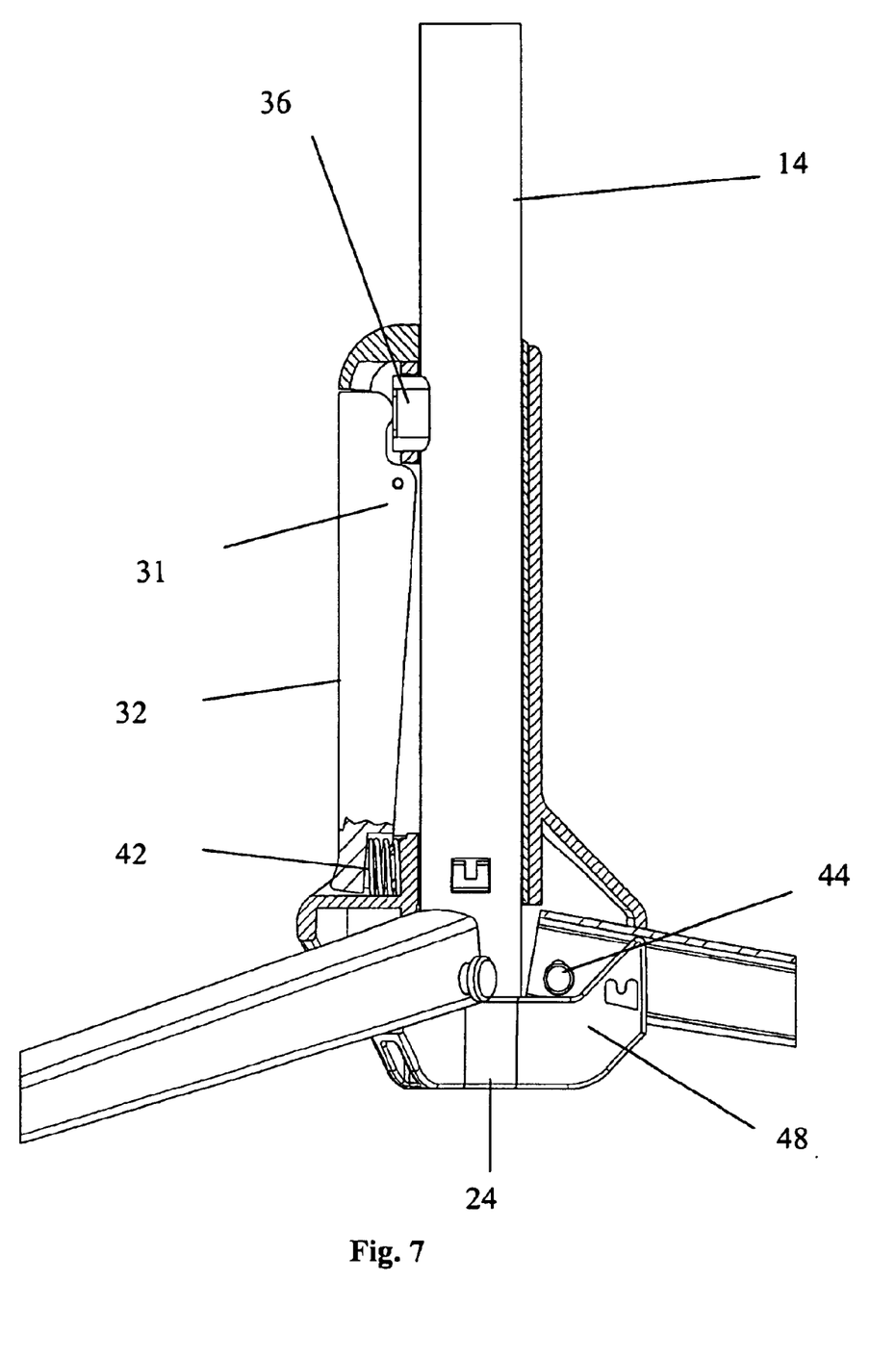
FIG. 7 is an exploded view of one embodiment of the present invention.

The locking element may, in some embodiments, be a high friction element (36) or may establish a high friction element (36), as seen in FIG. 7. In some embodiments, the high friction element (36) may be an elastomer or perhaps a high friction elastomer, or the like, that may be inserted into a rigid housing exposing the braking surface of the high friction element (36). The braking surface may be contoured to match the surface of the orthogonal element. The high friction element (36) may be restrained within the operation element (16). The high friction element (36) may hold the operation element (16) to the orthogonal element (14) at any point along the orthogonal element (14) and may also establish a high friction element between the operation element (16) and the reducible support structure (10). Thus, the operation element (16) may respond or perhaps stop moving when the high friction element (14) may be applied. Since the operation element (16) may move along the orthogonal element (14), the high friction element (36) may be applied and then released. A high friction element (36) may also be released with a bias release as explained above, among other things.

Figure 6:
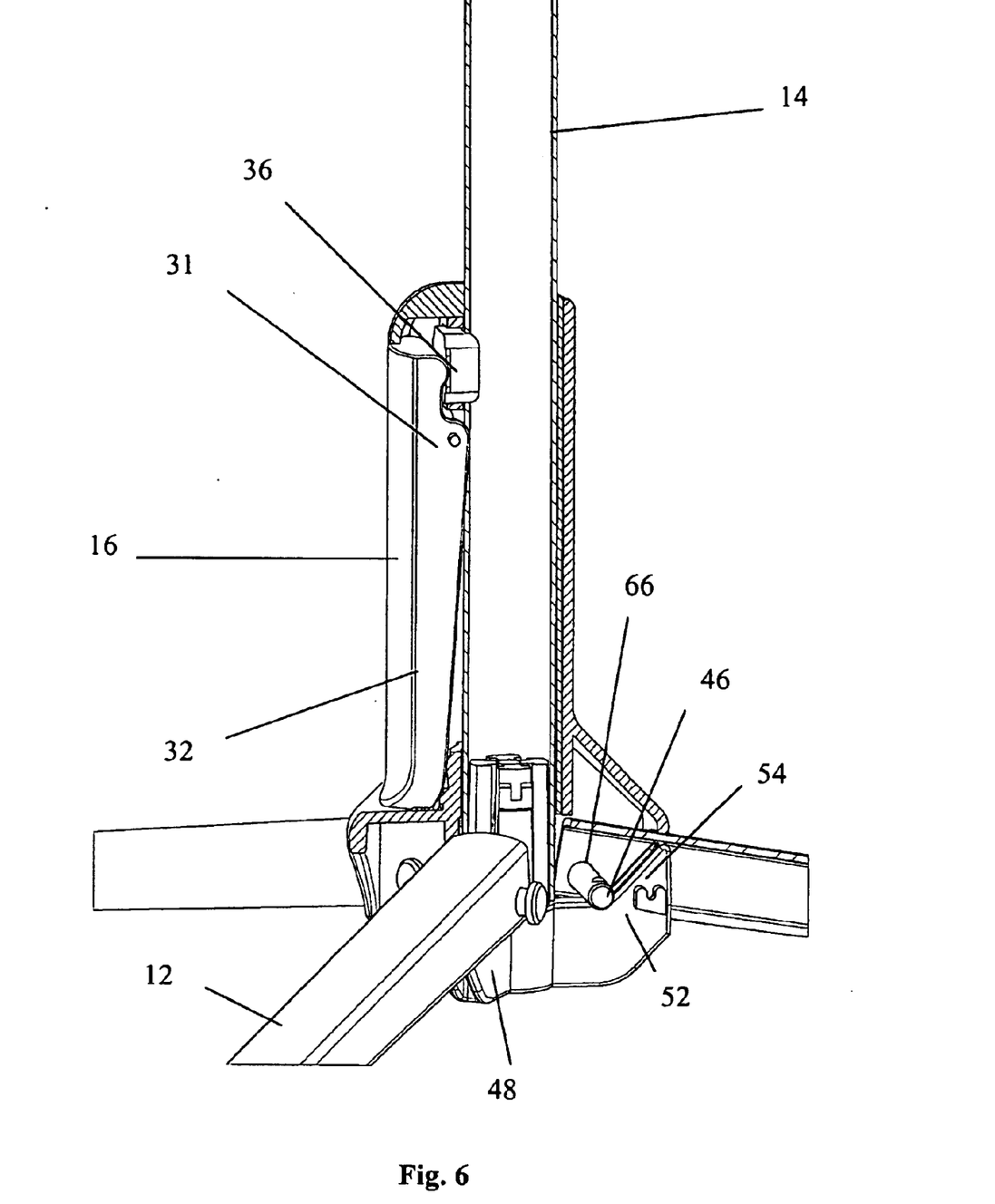
FIG. 6 is an exploded view of one embodiment of the present invention.
Figure 8:
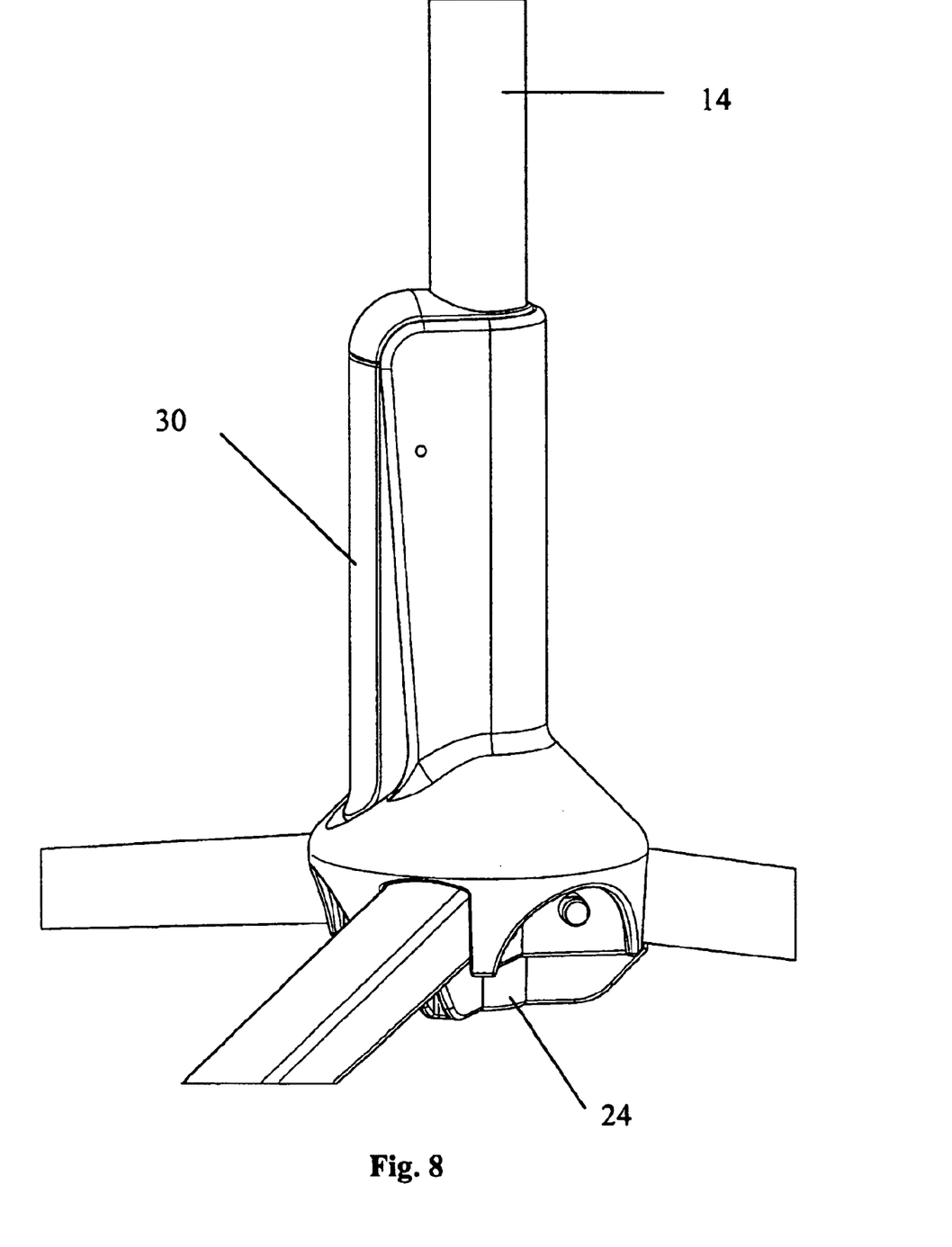
FIG. 8 is an exploded view of one embodiment of the present invention.

In accordance with some embodiments, a bias release may comprise a hand grip (30) shown in FIGS. 8 and 9. Accordingly, when an operator grips or holds the hand grip (30) with their hand, pressure may be applied to a lever (31), or perhaps a spring latch (32), which may push part of the spring latch (32) inward toward the orthogonal element (14), essentially causing a tip of the spring latch (32) to move outward, away from the orthogonal element (14), as shown in FIGS. 6 and 7. Further, the tip of the spring latch may apply force such as against the high friction element (36) when the hand grip (30) may be unengaged, essentially to apply an inward bias to frictionally engage the high friction element (36) to the orthogonal element (14). As such, in order for force to be applied to the high friction element (36), there may be a bias incorporated. For example, a spring (42) may be attached to a bottom portion of the spring latch (32). The spring may create a bias that pushes against the bottom portion of the spring latch (32) causing the tip of the spring latch (32) to apply pressure in the direction of the orthogonal element (14). Thus, when the operator grips the hand grip (30) located on the orthogonal element (14) (that may have a longitudinal axis) the operator may release the bias with a bias release. When the operator releases a bias that may be responsive to the hand grip (30). Further, the operator, while gripping the hand grip (30), can move the hand grip (30) along the orthogonal element (14). When the operator releases his/her hand from the hand grip (30), the bias may be engaged and the hand grip (30) may be at least temporarily secured to the orthogonal element (14) at the place where the hand grip (30) and bias was released.

In one embodiment, at least part of the hand grip (30) may be attached to at least part of the limb (12). Accordingly, when the hand grip (30) may be moved along the orthogonal element (14), the attached limb (12) may also move. Further, in one embodiment, the hand grip (30) may be located near a center of mass of the reducible support structure (10).

The present invention may also provide a dynamically operable limb movement restraint. Generally, the dynamically operable limb movement restraint may be an element that restrains the movement of the limb (12) at certain places along the orthogonal element (14). Dynamic may be relative movement in some regard, more specifically, dynamic may be the releasable, normally locked locking element. Thus, in one embodiment, the dynamically operable limb movement may comprise a locking element and in some embodiments, the dynamically operable limb movement may comprise a bias release.

The invention may further provide, in accordance with some embodiments, a spring latch (32). As described earlier, when the operator may be engaging the operation element (16) or more preferably may be gripping a hand grip (30), the operator may be releasing a spring latch (32). Thus, the spring latch (32) may be located within the operation element (32) and may be located within the hand grip (30). The operation element (16) and bias release may be responsive to the spring latch (32). The spring latch (32) may comprise a spring (42). When the spring latch (32) may be latched, a spring (42) may create a bias against part of the spring latch (32), causing another part of the spring latch (32) to push against a high friction element (36). An operator may be latching a spring latch (32) onto the reducible support structure (10). When the spring latch (32) may be released, the force an operator applies to the operation element may compress the spring (42) and therefore may causes the spring latch (32) to move away from the orthogonal element (14) and remove the force against the high friction element (36). Thus, when the spring latch (32) may be released or unlatched, the spring latch (32) and operation element (16) may be allowed movement along the orthogonal element (14). Contrary, when the spring latch may be latched, the spring latch and operation element may be held in place unable to move along the orthogonal element to at least some degree.

In one embodiment, at least part of the spring (42) may be connecting with at least part of operation element (16), thus the present invention, may provide for a spring (42) located in at least part of operation element (16). Further, the present invention may provide for latching at least part of spring latch to at least part of said operation element.

As shown in some figures, the limb (12) may comprise a channel (56). Embodiments of the present invention may provide for a limb channel (56) which may comprise off-axis engaging of limb channel (56). As shown in some figures, the limb (12) may be attached off of a central axis perhaps to enhance its structural integrity. The limb may be a non-aligned force vector to the orthogonal element (14). In one embodiment, the present invention may provide for inverting the limb channel (56).

The invention may further provide, in some embodiments, a shield. A shield may prevent exposure of the relative movement juncture which may be created when the reducible support structure (10) may be reduced or expanded, thereby preventing or at least reducing the risk of the operator's hands and fingers from pinching. The present invention may provide a shield over at least a portion of the relative movement juncture. More specifically, when the limbs (12), preferably a tripod (22), are being transposed, a dynamic connection location between the limb (12) and a plug element (24) may be created. The dynamic connection may be the moveable connection that the limb (12) and part of the plug element (24) create when they meet. The dynamic connection may be a slide comprising the limb (12) and part of the plug element (12).

Figure 2:
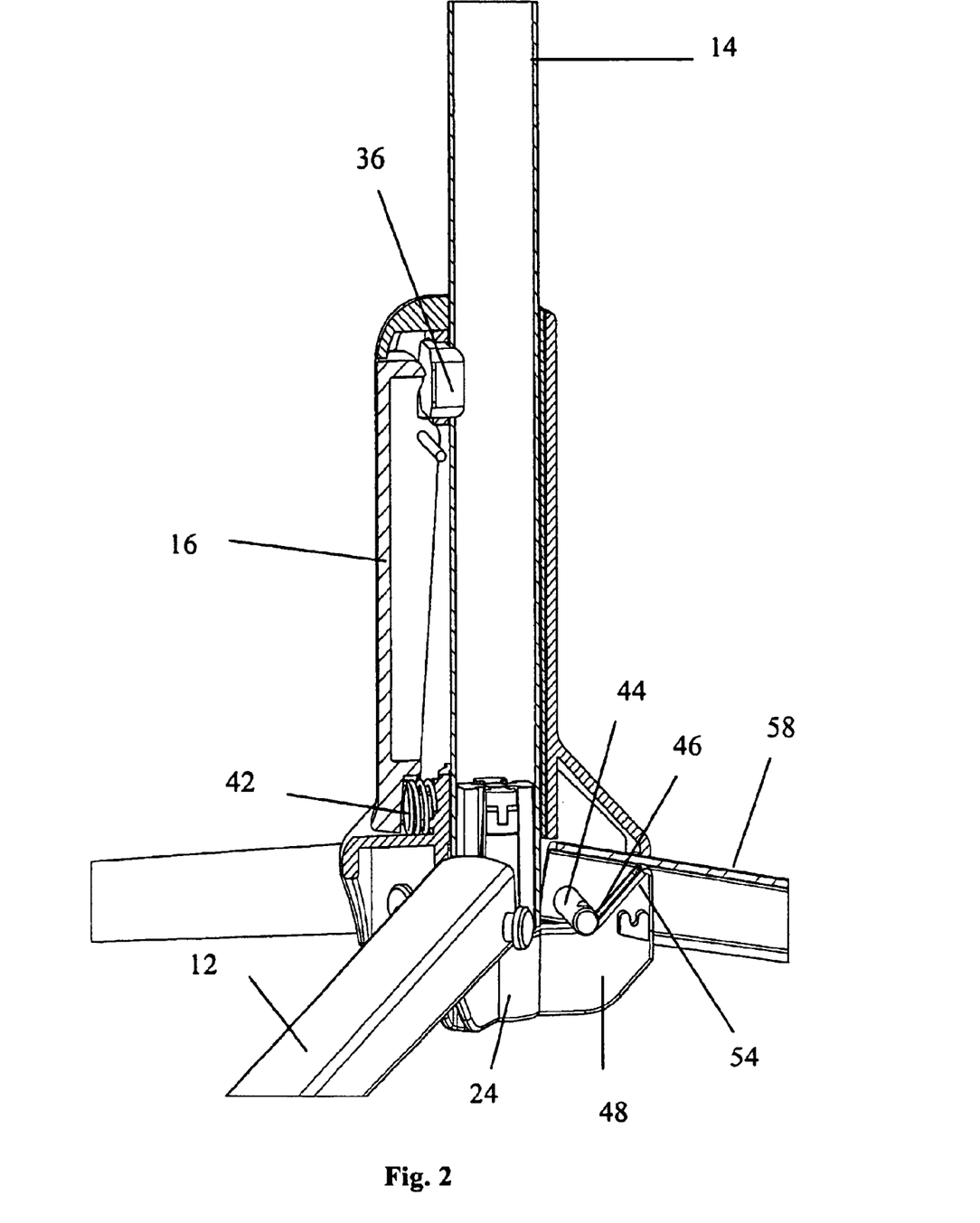
FIG. 2 is an exploded view of one embodiment of the present invention as a fully expanded structure.

As shown in some figures, the orthogonal element (14) may be hollow or may have an opening at one end to allow for some kind of insert. More preferably, the orthogonal element (14) may allow a plug element (24) to be inserted at one end of the orthogonal element (14). In some embodiments, the orthogonal element (14) may be manufactured so that the plug element (24) may be permanently attached to the orthogonal element (14). The present invention may provide, in some embodiment, for a plug element (24), essentially connected to an end of the orthogonal element (14). More generally, the present invention provides for connection of the plug element (24) with the reducible support structure (10). In one embodiment the plug element (24) may comprise at least one arm (48). In preferred embodiments, the plug element (24) may comprise three arms (48), as shown in FIGS. 2 and 6. The arms (48) may be curved or bent pieces. In other embodiments, the arm (48) may be straight and not curved. In some embodiments, each of the arms (48) may be radially situated on the plug element (24). The arms (48) may be distanced to meet with the limbs (12) perhaps of the tripod (22).

In embodiments the plug element (24) may comprise at least one internal limb fitting (50). In preferred embodiments, three internal limb fittings (50) may be provided. The internal limb fittings (50) may be situated radially on the plug element (24) and in some embodiments the internal limb fittings (50) may be located on part of the arm (48). The present invention may provide, in some embodiments, positioning the internal limb fittings (50) on the arm (48) of the plug element (24). The internal limb fitting (50) may be shaped so that it conforms to an inside of the limb channel (56), essentially allowing the internal limb fitting (50) to be placed inside the limb channel (56).

In some embodiments, when the operation element (16) may be moved along the orthogonal element (14), as mentioned earlier, the limbs (12) which may be attached to the operation element (16) also move along with respect to the orthogonal element (14). Since a plug element (24) may be attached to the bottom of the orthogonal element (14) and the internal limb fittings (50) attached to the limb channels (56), the limbs (12) may be responsive to internal limb fitting (50). When the operation element (16) may be engaged, it may move along with the limbs (12) along the orthogonal element (14). The limb channels (56) may slide against the internal limb fittings (50) of the plug element (24) when the limbs (12) are moved along with the operation element (16).

Figure 4:
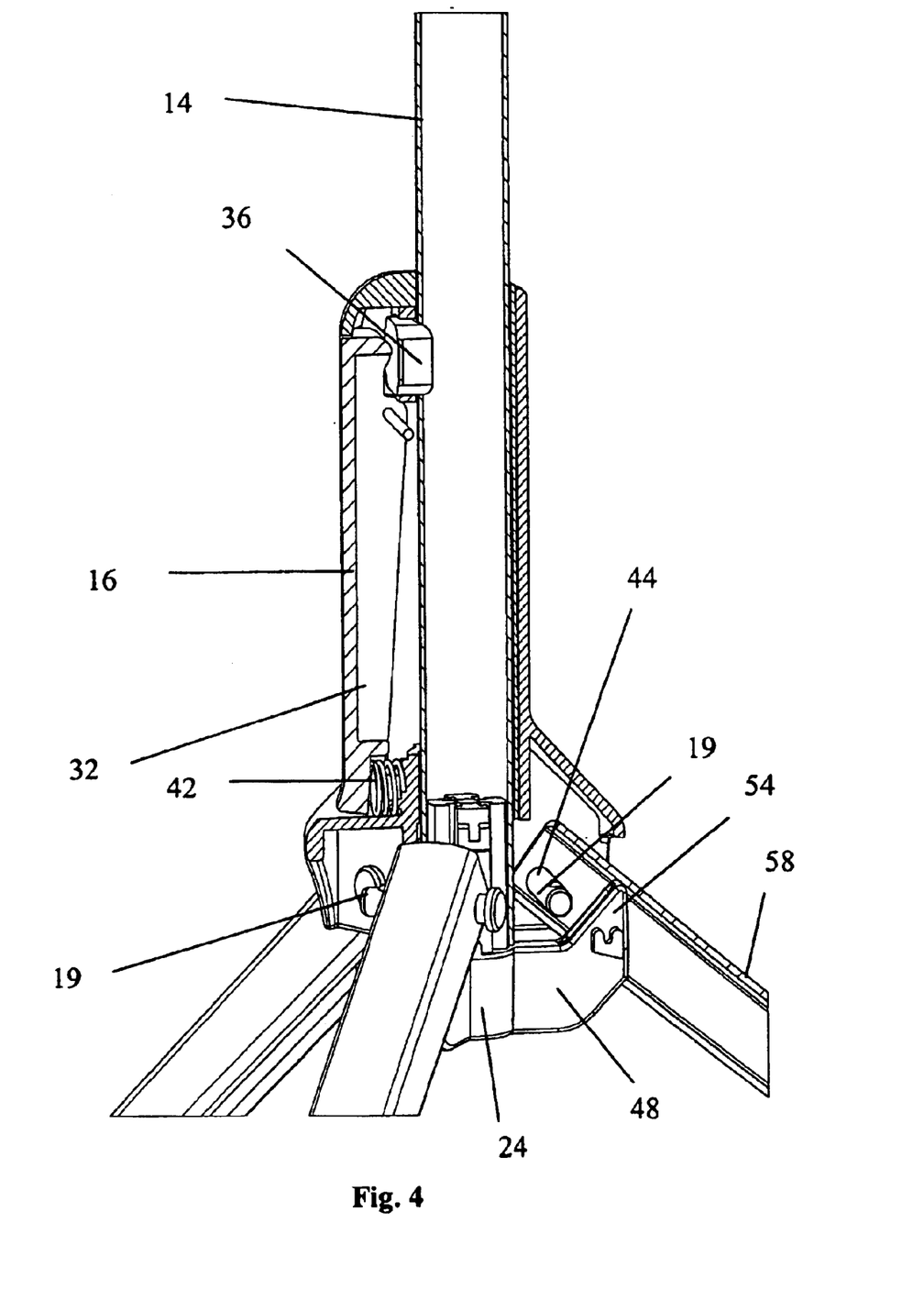
FIG. 4 is an exploded view of one embodiment of the present invention as a partially expanded structure.

In accordance with some embodiments of the present invention, the reducible support structure (10) may include a spur (52). At least one spur (52) may be located at an end of the arm (48). In other embodiments, the internal limb fitting (50) may include the spur (52). Also, the present invention may provide at least one spur (52) on at least one internal limb fitting (50). The plug element (24) having at least one internal limb fitting (50) with at least one spur (52) may be attached to the orthogonal element, as discussed earlier. Further, the spur (52) may be connected with the limb channel (56). The present invention may provide for connecting at least one spur (52) with a channel (56) of the limb. (12). In preferred embodiments, the spur (52) may be connected with the inverted limb channel (58), as seen in FIGS. 2, 4, and 5. Further, at least part of the spur (52) may slide along an internal slide of the inverted limb channel (58) when the operation element (16) and limbs (12) may be moved. The present invention may provide for the sliding of at least one spur (52) internally along the inverted channel (58) of the limb (12).

The present invention may provide, in accordance with some embodiments, a pivot element (44). The pivot element (44) may restrain movement of the limb (12) during transposition of the limbs (12). Therefore, the limb (12) may be responsive to the pivot element (44), essentially restraining the limb (12) to revolve around the pivot element (44). More particularly, the pivot element (44) may connect an end of limb (12) and a fastener (19), where the fastener (19) connects the limb (12) to the operation element (16), as discussed earlier. When the operation element (16) may be moved, the movement may essentially pivot the limb (12) with respect to the orthogonal element (14). More simply, the limb (12) may rotate around the pivot element (44), essentially causing the tripod (22) to expand and close in some embodiments. The pivot may not need separate braces for the limbs to move. More particularly, the limb (12) movement may be controlled when the internal limb fitting (50) slides along the limb channel. (56). As can be seen in some figures, the present invention may provide for pivoting the limb (12) with the internal limb fitting (50). In embodiments, the internal limb fitting (50) may be more radially distant than the pivot element (44). Thus, the location of the pivot element (44) may be closer to a central axis of the reducible support structure (10) than the location of the internal limb fitting (50). Further, a location of spur (52) may be more radially distant than the location of the pivot element (44) and in even another embodiment, positioning at least one internal limb fitting (50) more radially distant than the pivot element (44) as referenced by a central axis of the reducible support structure (10).

In accordance with some embodiments of the present invention the pivot element (44) may include an off-center pivot element (66). The off-center pivot element may even result from the placement of the fastener (19) through a part of the limb (12) that may not be the center of the limb, as more clearly understood in FIGS. 4 and 6. Further, the limb (12) may be responsive to the off-center pivot clement (66) when the limb (12) may be transposed. In one embodiment, the limb (12) may be off-center pivoted with respect to a central axis of the reducible support structure.

While expanding the tripod (22), the present invention may provide for a pivot-arm-nest element (46) that essentially stops the pivoting of the limbs (12) and holds the limbs (12) in a fully expanded state. As shown in FIGS. 2 and 6, the pivot-arm-nest element may comprise the nesting of the arm (48) attached to the plug element (24) with at least part of limb (12), preferably with the fastener (19).

In one embodiment, the present invention may even provide for a recurve spur (54). The recurve spur (54) may be a spur (52) that may be at or above the pivot when the tripod (22) may be fully extended, as seen in FIG. 2 or partially extended, as seen in FIG. 4. In one embodiment, the present invention may provide for a recurve spur (54) that may be configured to extend at least even with the pivot element (44). Accordingly, when the reducible support structure (10) may be extended, the spur (52), as described earlier, may rest near the pivot element (44) and a recurve spur (54) may be located at least even with the pivot element (44). Also, when the reducible support structure (10) may be fully reduced, the recurve spur (54) may be located below the pivot element (44), further understood in FIG. 5.

In accordance with preferred embodiments of the present invention, the limb channel (56) may have a bidirectionally retained track channel, as shown in FIG. 3. The spur (52), as discussed earlier, may be retained within the bidirectionally retained track channel. Bidirectionally may be the restriction of the spur (52) to move in two directions: either down the limb channel (56) or up the limb channel (56). The bidirectionally retained track channel may hold the spur (52), essentially allowing the spur (52) to move along the inside of the track channel, while retaining the spur (52) within the track channel.

The bidirectionally retained track channel may allow the limb (12) to be reduced and expanded thereby creating a shielded movement. More specifically, in one embodiment, when an operator would like to reduce a reducible support structure (10), the operator may place one hand near the top of the orthogonal element (14) and may also place another hand on the operation element (16). The operator may engage the operation element (16) and may pull the operation element (16) in an upward or such movement towards the operator's hand located near the top of the orthogonal element (14). While doing so, the end of the limb (12) attached to the operation element (16) may be also pulled up, as described earlier. Since the spur (52) may be retained within the bidirectionally retained track channel of the limb (12), the spur (52) may slide along the track channel. The sliding may cause the limb (12) to pivot in a downward rotation, as understood in FIG. 5, until the limb (12) may be fully reduced. The operation element may be then disengaged. Further, since the spur (52) may be retained within the track channel, the limb (12) may not be extended until the operation element (16) may be re-engaged. Thus, the limb (12) may be locked in its reduced state and may be in an essentially nearly parallel relationship to the orthogonal element (14). Further, the reducible support structure (10) can be transported and stored without any parts of the structure moving.

In accordance to some embodiments, when an operator would like to expand the reducible support structure (10), the operator may place one hand near the top of the orthogonal element (14) and another hand on the operation element (16). The operator may engage the operation element (16) and may push, in a downward movement, the operation element (16) away from the hand located near the top of the orthogonal element (14). While pushing, a downward force may also be applied to the end of the limb (12) attached to the operation element (16). This may cause the limb (12) to begin to pivot such as in an upward rotation. Since the spur (52) may be retained in the track channel, the spur (52) may slide along the track channel allowing a smooth transposition of the limb (12). When the spur (52) meets the fastener (19), the limb (12) may be fully expanded. The operation element (16) may be disengaged therefore locking the limbs in place until the operation element may be engaged again.

The present invention may provide in preferred embodiments, the bidirectionally retained track channel to be undercut, having a T-slot, L-slot, or the like, shape. This is further illustrated in FIG. 3. The T-slot shape may allow for the spur (52) to be retained within the T-slot track channel while allowing the spur (52) to move up and down the T-slot track channel, in the same manner as described earlier between the spur (52) and the bidirectionally track channel.

Accordingly, one embodiment of the present invention may provide for bidirectionally retaining at least one spur (52) in a track channel. Further, one embodiment may provide for a T-slot track channel (59). Also, the present invention may provide for bidirectionally retaining at least one spur (52) in a T-slot track channel. The present invention may provide for an internal limb fitting (50) to be contained in a bidirectionally retained track channel. More specifically, the present invention may provide for an internal limb fitting (50) to be contained in a T-slot track channel. As such the internal limb fitting (50) may be T-shaped to conform to the T-slot shape of the T-slot track channel. One general embodiment, may provide for bidirectionally retaining a plug element (24), wherein part of the plug element (24) slides along the track of the limb channel (56). Further, the plug element (24) may slide along a T-slot track of the limb channel (56).

Figure 10:
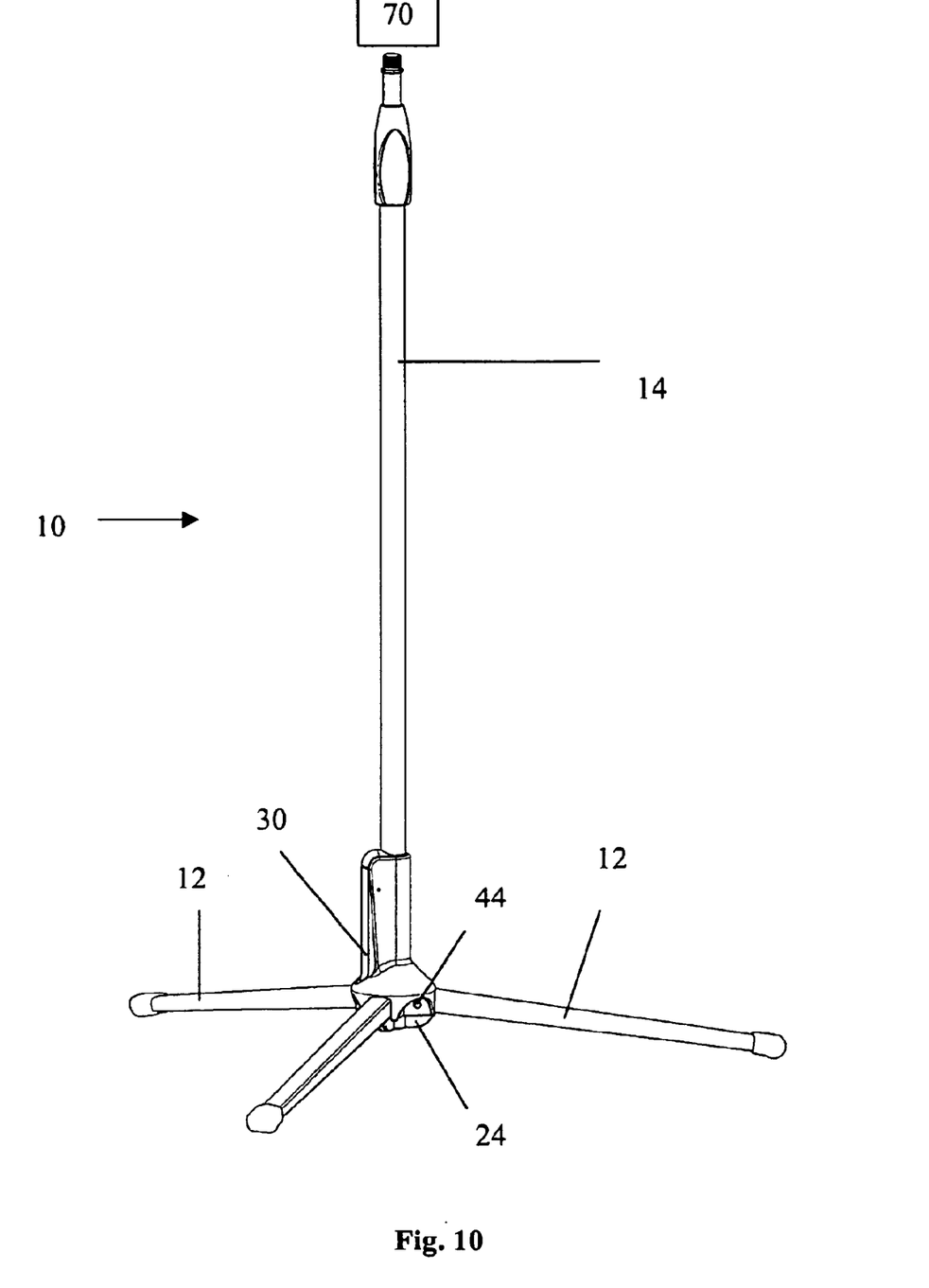
FIG. 10 is a second perspective view of one preferred embodiment of the present invention depicted in FIG. 1.

In one embodiment, the present invention may provide a movement restraint. The movement restraint may be restraining movement of reducible support stricture (10) with the reduced movement restraint. A reduced movement restraint may simply be the contact between the spur (52) and a foot cap (65) as shown in FIG. 10, located near the bottom of the limb (12). The reduced movement restraint may also act to keep the spur (52) from sliding out of an end of the limb channel (56). A foot cap (65) may also be an interruption or termination of the limb channel (56) at the end of the limb (12).

In some embodiments, the movement restraint may be restraining movement of reducible support structure (10) with an expanded movement restraint. An expanded movement restraint stops the limb (12) from further expanding when the limb (12) may have reached its preferred position in a fully expanded state. An expanded movement restraint may be the spur (52) contacting the fastener (19). An expanded movement restraint may also be part of the limb (12) connecting with part of the operation element (16), essentially preventing the limb (12) from any further expansion.

Figure 1:
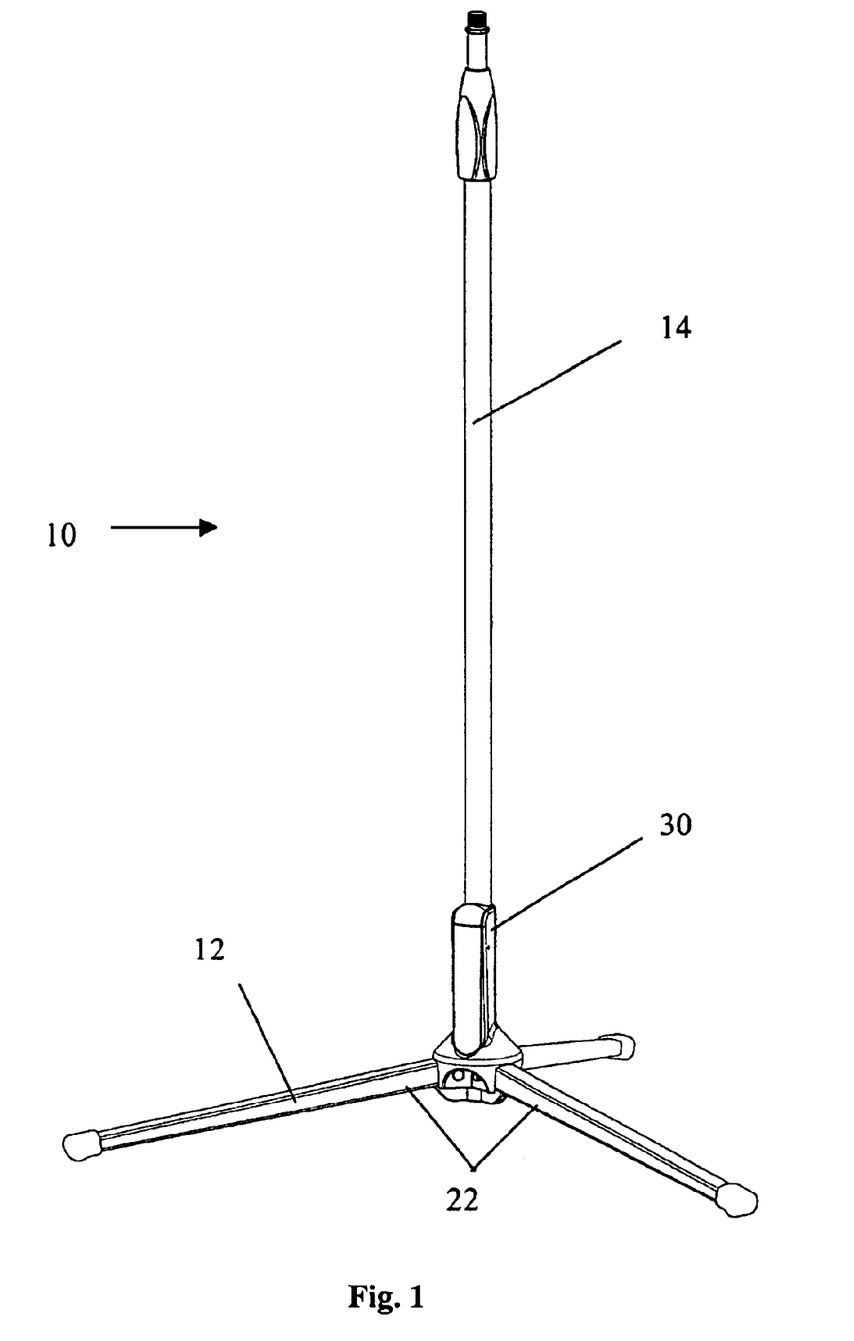
FIG. 1 is a perspective view of one particular embodiment of the present invention.

As shown in FIGS. 1 and 10, some embodiments may provide a stand. In some embodiments an attachment of some sort may be added to the top of the stand, essentially connecting an attachment to the top of the orthogonal element. In some embodiments, the attachment may be a microphone (70). In some embodiments, the attachment may be some sort of music item. A music item support may comprise, but not limited to, a stand for printed music and more generally, for any music-related object such as an instrument, loudspeaker, or the like. In some embodiments, the attachment may be some sort of bicycle item, providing a bicycle item support. Further, in some embodiments, the attachment may be an illumination item, perhaps even providing a light support. An illumination device may be a flood light stand, a shop light, or the like.

As can be easily understood from the foregoing, the basic concepts of the present invention may be embodied in a variety of ways. It involves both reducible support system techniques as well as well as devices to accomplish the appropriate reducible support structure. In this application, the reducible support systems are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims.

It should also be understood that a variety of changes may be made without departing from the essence of the invention. Such changes are also implicitly included in the description and its application to a variety of reducible support systems. They still fall within the scope of this invention.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "bias" should be understood to encompass disclosure of the act of "biasing"—whether explicitly discussed or not—and, conversely, were there effectively disclosure of the act of "biasing", such a disclosure should be understood to encompass disclosure of a "bias" and even a "means for biasing." Such changes and alternative terms are to be understood to be explicitly included in the description.

All patents, publications, or other references mentioned in this application for patent or listed in an attached information disclosure statement are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. Finally, as to all references listed or specifically mentioned, each is hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to claim at least: i) each of the reducible support system devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, and ix) methods and apparatuses substantially as described hereinbefore and with reference to any of the accompanying examples, x) the various combinations and permutations of each of the elements disclosed, and xi) each potentially dependent claim or concept as a dependency on each and every one of the independent claims or concepts presented. In this regard it should be understood that for practical reasons and so as to avoid adding potentially hundreds of claims, the applicant may eventually present claims with initial dependencies only. Support should be understood to exist to the degree required under new matter laws—including but not limited to European Patent Convention Article 123(2) and United States Patent Law 35 U.S.C. § 132 or other such laws—to permit the addition of any of the various dependencies or other elements presented under one independent claim or concept as dependencies or elements under any other independent claim or concept. Further, when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

In addition, the claims set forth later in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A reducible support structure comprising:
  a. an orthogonal element having a longitudinal axis;
  b. an operation element responsive to said orthogonal element;
  c. a limb off-axis responsive to said operation element;
  d. a dynamic connection to which said limb is responsive having a movement juncture;
  e. a shield over at least a portion of said relative movement juncture;
  f. wherein said orthogonal element having said longitudinal axis comprises a central member;

g. a multipod wherein said limb comprises more than one limb;

h. a locking element to which said operational element is responsive; and i. at least part of said operation element is attached to at least part of said limb, wherein said shield comprises a T-slot track channel.

2. A reducible support structure of claim 1 further comprising a support device, wherein said support device is a music item support.

3. A reducible support structure of claim 1 further comprising a support device, wherein said support device is a bicycle item support.

4. A reducible support structure of claim 1 further comprising a support device, wherein said support device is an illumination item support.

5. A reducible support structure comprising:

a. an orthogonal element having a longitudinal axis;

b. an operation element responsive to said orthogonal element;

c. a limb off-axis responsive to said operation element;

d. a dynamic connection to which said limb is responsive having a relative movement juncture; and e. a shield over at least a portion of said relative movement juncture, wherein said operation element comprises a hand grip.

6. A reducible support structure comprising:

a. an orthogonal element having a longitudinal axis;

b. an operation element responsive to said orthogonal element;

c. a limb off-axis responsive to said operation element;

d. a dynamic connection to which said limb is responsive having a relative movement juncture;

e. a shield over at least a portion of said relative movement juncture; and f. a spring latch to which said operation element bias release is responsive.

7. A reducible support structure comprising:

a. an orthogonal element having a longitudinal axis;

b. an operation element responsive to said orthogonal element;

c. a limb off-axis responsive to said operation element;

d. a dynamic connection to which said limb is responsive having a relative movement juncture;

e. a shield over at least a portion of said relative movement juncture; and f. a plug element connected to an end of said orthogonal element.

8. A reducible support structure of claim 7 wherein said plug element comprises at least one arm.

9. A reducible support structure of claim 8 wherein said arm comprises at least one internal limb fitting.

10. A reducible support structure of claim 9 wherein said at least one internal limb fitting comprises at least one spur located at an end of said arm.

11. A reducible support structure of claim 7 further comprising a pivot element to which said limb is responsive.

12. A reducible support structure of claim 11 wherein said pivot element comprises an off-center pivot element to which said limb is responsive.

13. A reducible support structure of claim 10 further comprising a pivot element wherein said spur comprises a recurve spur.

14. A reducible support structure of claim 13 wherein said recurve spur is configured to extend at least even with said pivot element.

15. A reducible support structure of claim 10 wherein said limb comprises a channel and said spur connects with said channel.

16. A reducible support structure of claim 10 wherein said limb comprises an inverted channel and said spur connects with said inverted channel.

17. A reducible support structure of claim 16 wherein said inverted channel comprises a bidirectionally retained track channel.

18. A reducible support structure of claim 17 where said bidirectionally retained track channel comprises a T-slot track channel.

19. A reducible support structure of claim 16 wherein at least part of said spur of said arm slides along an internal slide of said inverted channel of said limb.

20. A reducible support structure of claim 11 wherein said internal limb fitting of said arm is more radially distant than said pivot element.

21. A reducible support structure comprising:

a. an orthogonal element having a longitudinal axis;

b. an operation element responsive to said orthogonal element;

c. a limb off-axis responsive to said operation element;

d. a dynamic connection to which said limb is responsive having a relative movement juncture; and e. a shield over at least a portion of said relative movement juncture, wherein said shield comprises a T-slot track channel.

22. A reducible support structure of claim 5 wherein said hand grip is located near a center of mass of said reducible support structure.

23. A reducible support structure of claim 5 wherein at least part of said hand grip is attached to at least part of said limb.

24. A reducible support structure of claim 6 wherein at least part of said spring latch is connected with at least part of said operation element.

25. A reducible support structure of claim 6 wherein said spring latch comprises a moveable stopping element which said spring latch stops at a point along said orthogonal element.

26. A reducible support structure of claim 5 further comprising a support device, wherein said support device is a music item support.

27. A reducible support structure of claim 5 further comprising a support device, wherein said support device is a bicycle item support.

28. A reducible support structure of claim 5 further comprising a support device, wherein said support device is an illumination item support.

29. A reducible support structure comprising:

a. an orthogonal element having a longitudinal axis;

b. an operation element responsive to said orthogonal element;

c. a limb off-axis responsive to said operation element;

d. a dynamic connection to which said limb is responsive having a movement juncture;

e. a limb channel; and f. a plug element connected to an end of said orthogonal element.

30. A reducible support structure comprising;

a. an orthogonal element having a longitudinal axis;

b. an operation element responsive to said orthogonal element;

c. a limb off-axis responsive to said operation element;

d. a dynamic connection to which said limb is responsive having a relative movement juncture;

e. a limb channel, wherein said limb channel comprises a bidirectionally retained track channel to which a plug element connected to an end of said orthogonal element and having at least one internal limb fitting is contained.

31. A reducible support structure of claim 30 wherein said bidirectionally retained track channel comprises a T-slot track channel to which said plug element having said at least one internal limb fitting is contained.

* * * * *